(12) United States Patent
Hintermeister (10) Patent No.: US 8,429,682 B2
(45) Date of Patent: Apr. 23, 2013

(54) DISC WITH EMBEDDED FLASH MEMORY AND DISC DRIVE

(75) Inventor: Gregory R. Hintermeister, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 13/534,556

(22) Filed: Jun. 27, 2012

(65) Prior Publication Data

US 2012/0287768 A1 Nov. 15, 2012

Related U.S. Application Data

(62) Division of application No. 11/969,416, filed on Jan. 4, 2005, now Pat. No. 8,234,667.

(51) Int. Cl.
 *G11B 3/70* (2006.01)
 *G11B 7/24* (2006.01)

(52) U.S. Cl.
 USPC .................................... 720/718; 369/273

(58) Field of Classification Search .................. 369/273; 720/718, 721, 722, 723; 428/64.4
 See application file for complete search history.

(56) References Cited

U.S. PATENT DOCUMENTS

| | | | |
|---|---|---|---|
| 4,814,924 A | 3/1989 | Ozeki | 360/133 |
| 4,868,373 A | 9/1989 | Opheij et al. | 235/380 |
| 5,049,728 A | 9/1991 | Rovin | 235/492 |
| 5,132,947 A | 7/1992 | Kameda et al. | 369/30.03 |
| 5,159,182 A | 10/1992 | Eisele | 235/492 |
| 5,771,143 A | 6/1998 | Vernois | 360/133 |
| 5,930,816 A | 7/1999 | Fujita | 711/104 |
| 5,940,363 A | 8/1999 | Ro et al. | 369/273 |
| 6,044,046 A | 3/2000 | Diezmann et al. | 369/14 |
| 6,089,459 A | 7/2000 | Eisele et al. | 235/492 |
| 6,125,061 A | 9/2000 | Mitani | 365/185.33 |
| 6,298,016 B1 | 10/2001 | Otsuka | 369/14 |
| 6,449,124 B1 | 9/2002 | Hoyle | 360/133 |
| 6,510,125 B1 * | 1/2003 | Shigetomi et al. | 369/273 |
| 6,535,465 B1 * | 3/2003 | Shigetomi et al. | 369/14 |
| 6,680,897 B2 | 1/2004 | Ono et al. | 369/273 |
| 6,832,730 B2 | 12/2004 | Conner et al. | 235/487 |
| 7,025,265 B2 | 4/2006 | Tsai et al. | 235/449 |
| 7,232,074 B2 | 6/2007 | Maher et al. | 235/492 |
| 7,256,698 B2 | 8/2007 | Su | 340/572.8 |
| 7,457,227 B2 | 11/2008 | Senshu et al. | 369/273 |
| 7,710,852 B2 | 5/2010 | Oshima et al. | 369/273 |
| 2002/0036977 A1 | 3/2002 | Lenssen et al. | 369/273 |
| 2002/0075790 A1 | 6/2002 | Shigetomi et al. | 369/273 |
| 2002/0097664 A1 | 7/2002 | Ono et al. | 369/273 |
| 2004/0052202 A1 | 3/2004 | Brollier | 369/273 |
| 2004/0052203 A1 | 3/2004 | Brollier | 369/272 |
| 2005/0022225 A1 | 1/2005 | Blackford | 720/718 |
| 2005/0157600 A1 | 7/2005 | Teicher | 369/30.03 |
| 2006/0187805 A1 | 8/2006 | Lind et al. | 369/273 |
| 2007/0064578 A1 | 3/2007 | Usami et al. | 369/273 |

(Continued)

*Primary Examiner* — Brian Miller
(74) *Attorney, Agent, or Firm* — Harrington & Smith (57) ABSTRACT

A disc has an outer section on which digital media can be recorded and a core in its center in which a flash memory is embedded with the core having a central hole and electrical contacts to the flash memory. A disc drive has a drive spindle that is to extend into the disc core central hole with one of the spindle or spindle hub having electrical contacts to engage with the core electrical contacts so that data can be written into and/or read from the core flash memory by electronic components of the drive.

9 Claims, 5 Drawing Sheets

U.S. PATENT DOCUMENTS

| | | | |
|---|---|---|---|
| 2007/0070867 A1 | 3/2007 | Forster et al. | 369/273 |
| 2007/0140072 A1 | 6/2007 | Agrawal et al. | 369/14 |
| 2007/0284271 A1 | 12/2007 | Anzai et al. | 206/308.1 |
| 2008/0165665 A1 | 7/2008 | Martin et al. | 369/273 |
| 2008/0209460 A1 | 8/2008 | Karimoto et al. | 720/718 |
| 2009/0016204 A1 | 1/2009 | Pempsell et al. | 369/273 |
| 2009/0052309 A1 | 2/2009 | Hoffman | 369/273 |

\* cited by examiner

DISC WITH EMBEDDED FLASH MEMORY AND DISC DRIVE

CROSS REFERENCE TO RELATED APPLICATIONS

This is a divisional patent application of copending U.S. patent application Ser. No. 11/969,416, filed Jan. 4, 2008, now U.S. Pat. No. 8,234,667.

FIELD OF THE INVENTION

The present invention is for a disc having a center core with an embedded flash memory to store information and a drive for writing into and reading the information from the disc flash memory.

BACKGROUND OF THE INVENTION

Discs that store digital information are well known. Discs are of different construction and use different formats to store different types of information such as data, computer application programs, and music and video media. For equal physical size of the different discs a video disc usually stores the greatest amount of data, often several hundred megabytes. In today's environment, digital video discs (DVDs) and High Definition DVDs also are being used as the source of various types of games both for computer operated games and games operated from dedicated systems or consoles, such as Sony Play Station, Microsoft X Box and similar systems.

In game playing use, a user inserts the DVD disc into the game console and starts playing. However, in using the discs an inconvenience sometimes is present. This is that a user of the disc often generates custom information that he might wish to access at a later time. Such custom information might be the level of the game being played, point of stopping, data of competition where several people are playing the game from the same disc, and others. For gaming systems, the custom information acquired while playing the game usually is stored on the game console itself. If a game disc is brought to another console, all custom data previously used is not present. Sometimes the game console has a separate memory card that stores the custom information and the user manually moves the memory card over to the new console. However, this means that the memory cards must be purchased and carried together with the game disc to the new console. This is somewhat inconvenient in that the user has two different items to purchase and to transport and mate with each other. A similar problem exists with discs that store other types of data, such as application programs, where it would be desirable to be able to easily access custom settings to operate the program. Accordingly, a need exists for an inexpensive and scalable way to combine a disc for distribution with the ability to keep custom setting information with the disc.

SUMMARY

The invention provides a disc that includes a flash memory and a disc drive that communicates with the disc flash memory. The disc has the physical size and uses the standard formats for storing information as conventional discs, such as a DVD disc. In the disc of the invention the plastic interior rim, or core, at the disc center is replaced by a core that includes an embedded flash memory. Flash memory is a conventional non-volatile computer memory that can be electrically erased and reprogrammed. It is a specific type of EEPROM (electrically erasable programmable memory) that is erased and programmed in large blocks and is used in applications such as PDAs (personal digital assistants) and laptop computers, digital audio players, digital cameras and mobile phones.

The disc having the flash memory is inserted into a compatible disc drive that has the necessary electronic components for reading from and writing to the disc flash memory. The disc has contacts that are connected to its flash memory and the drive has mating contacts connected to its electronic components so that the drive can "talk to" the disc flash memory. In one embodiment the spindle of the disc drive has contacts on its periphery that mate with contacts on the disc extending from the flash memory onto the peripheral wall of the disc core center hole. In another embodiment the disc has a tab that extends into a disc alignment slot on the spindle with the mating contacts being on the disc tab and in the spindle slot. In still a further embodiment the contacts from the flash memory are on the bottom of the disc and mate with contacts on the drive spindle hub. All of these embodiments make it possible to write information to or read it from the disc flash memory even while the disc is playing. The information that can be written into and read from the flash memory includes all of the custom information referred to above. Other customization information includes the last location in a movie, extras of the movie already viewed, other custom information about movie watching experience, etc. The disc of the invention is backward compatible with prior art drives since it has the same or compatible physical characteristics as standard discs.

In another embodiment of the invention, the disc core having the flash memory can be removed and placed inside another disc in the event the first disc gets scratched, or if the user wants to upgrade to more storage flash memory capacity for use with the media on his disc. It also permits the custom data stored in the disc core to be transported by moving only the core.

In another embodiment of the invention is a method that includes providing a disc having an outer section on which digital data is recorded and an inner core having a central hole and a flash memory with electrical contacts. The electrical contacts of the flash memory are engaged with drive electrical contacts of a motor spindle or a hub of a disc drive, and while rotating the disc in the disc drive about the motor spindle that extends into said central hole, data is read from or written data to the flash memory via the drive electrical contacts. In particular embodiments, one or any combination may also be employed: the contacts of the disc core extend onto the periphery of a wall of the core that forms the central hole and the drive electrical contacts are accessible from the outer periphery of said drive spindle; the core may have an alignment tab extending from into the central hole and the core electrical contacts are on this tab, and the drive spindle has a vertical slot into which the alignment tab fits and the drive electrical contacts are in the spindle slot; the core electrical contacts may be on a surface of the core and the drive electrical contacts are on the hub; and further while rotating the disc, data is simultaneously optically read from the disc outer section and electrically read from the flash memory.

BRIEF DESCRIPTION OF THE DRAWINGS

Other objects and advantages of the present invention will become more apparent upon reference to the following specification and annexed drawings, in which.

DETAILED DESCRIPTION

Figure 1:
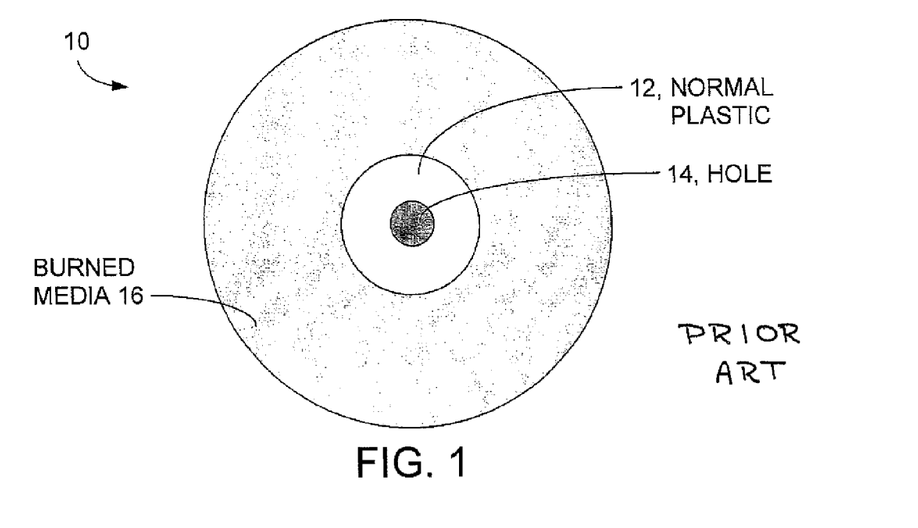
FIG. 1 is a plan view of a conventional disc, such as of the DVD type, with the data section and the plastic center core with its hole.

FIG. 1 shows a conventional disc 10, such as a DVD or HD DVD disc, that stores digital data. Such a conventional disc typically has a central core 12 of a clear or colored plastic material with a central hole 14 through which the spindle of a player and/or recorder drive is to extend to rotate the disc. Concentrically surrounding the core 12 is the section 16 of the disc, hereafter referred to as the media section, on which the information or media in its designated format is to be read out from and/or recorded onto. The media containing section 16 is typically formed of a base of polycarbonate on the lower surface of which the digital media is recorded. The upper surface of the base is covered by a reflective material, such as a layer of aluminum, which in turn is covered by a protective layer of acrylic plastic.

Figure 2:
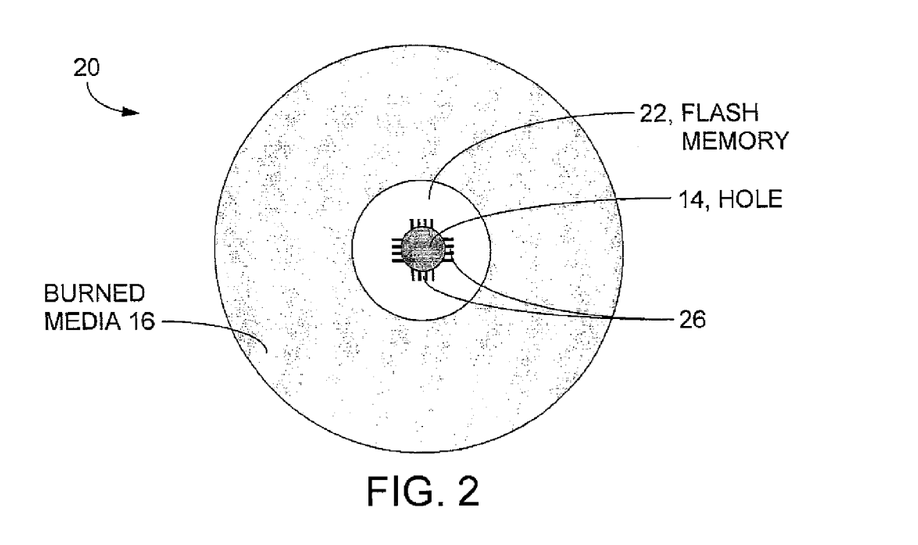
FIG. 2 is a plan view of the disc of the invention with core having the flash memory.

In the present invention, as shown in FIG. 2, the disc 20 of the invention retains the media section 16 of the conventional disc on which the digital data or media is stored. The disc 20 of the invention has a central core 22, preferably of a plastic material, with the usual center hole 14 for the drive spindle. Embedded in the core 22 is one or more semiconductor flash memory elements 24 as well as one or more sets of contacts 26 for the flash memory. In the embodiment of FIG. 2 the flash memory 24 is on the top of the core and the contacts 26 extend downwardly on the peripheral wall of the core that surrounds the core center hole 14 and are to make contact with corresponding contacts on the spindle of a disc drive, described below. As an alternative, the flash memory can be on the bottom of the core and the contacts 26 extend upwardly on the core center hole peripheral wall. Either arrangement permits appropriate electronic circuitry of the drive to be able to write data into and/or read it from the core flash memory 24.

Figure 3:
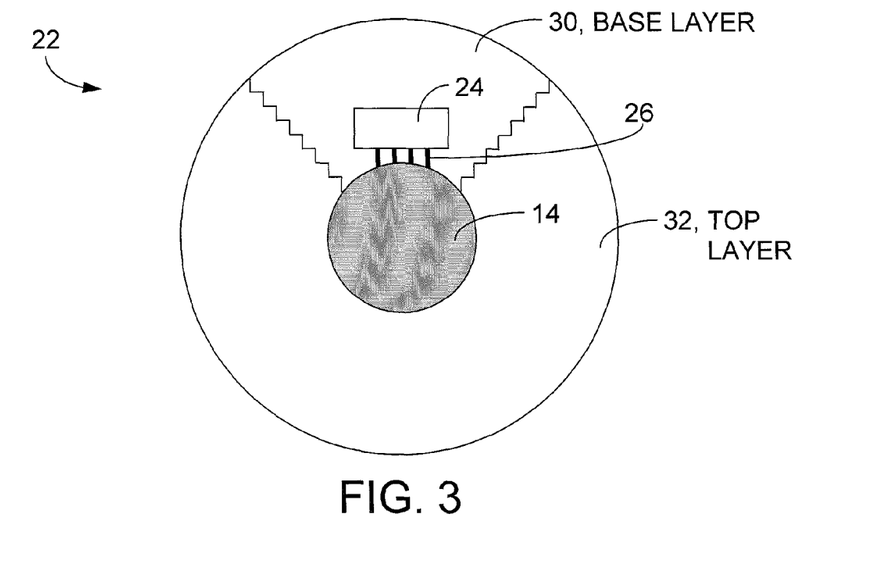
FIG. 3 is an enlarged plan view, partly broken away, of the disc core with the flash memory and its electrical connections.

FIG. 3 shows an enlarged view of the core 22. There is a base layer 30 of plastic or other suitable material on which the one or more flash memories 24 are placed or deposited. That is, a discrete flash memory chip can be mounted on the top or bottom of the core base layer 30 or in a recess in the base layer. As an alternative the transistors and other components and circuits of the flash memory are directly deposited on the base layer using any conventional semiconductor memory manufacturing technique. The flash memory is of the desired storage capacity. The manufacturing process also includes laying down the appropriate number of electrical contacts 26, which depends on the flash memory configuration, to connect to the flash memory 24. In the embodiments of FIGS. 2 and 3 the contacts 26 extend on the periphery of the core 22 center hole 14 so as to be able to contact corresponding contacts on a drive spindle so as to enable reading from or writing to the flash memory 24. FIG. 3 shows only one set of contacts 26. FIG. 2 shows four sets of contacts 26 spaced about 90 degrees apart around the periphery of the core hole 14. Both configurations are illustrative only and any desired number of contact sets can be used. If more that one set of contacts is used, then appropriate electrical traces would be deposited on the core base layer 30 to connect the corresponding contacts of the sets to the flash memory. A layer 32 of a protective material such as plastic is placed on the core base layer 30 to cover the flash memory 24 and the contacts 26. Additional layers or patches of insulating material can be provided on the core to insulate the electrical traces between plural sets of contacts 26.

Figure 4:
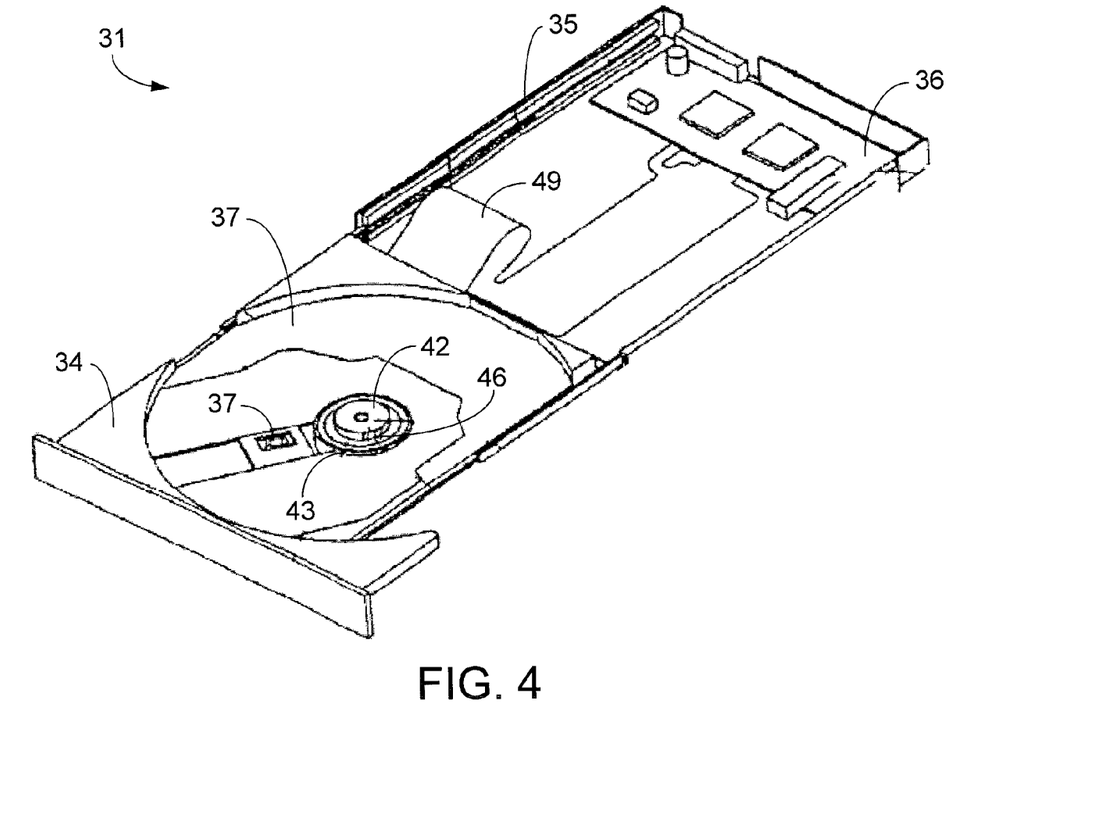
FIG. 4 is a perspective view of a tray of a drive for reading from and/or writing to the flash memory of the disc of FIG. 2.

FIG. 4 shows a player/recorder (read/write) drive 31 that is for the disc 20 of the invention as well as for conventional discs. The drive 31 is shown as having a tray 34 that slides in and out of a housing 35 having a circuit board 36 with electronic components for performing read/write operation to the disc media section 16 and the flash memory 24. Tray 34 has a circular depression 37 in which the disc 20 is to rest. A spindle 42 that is to extend into the disc center hole 14 projects upwardly from a flat base 43 that is mounted on a disc drive motor (not shown). As the drive motor rotates a disc resting on the spindle base 43 rotates with it. The spindle 42 has at least one set of electrical contacts 46 on its outer periphery that are to mate with the contacts 26 of the disc 20. There is an appropriate type of connector that provides electrical connection with the spindle contacts 46 as the spindle rotates and leads within the spindle 42 from such connector and through a flat cable 49 to the electronic components on the drive circuit board 36. As seen, the drive 31 is able to write to and/or read from the disc flash memory 24 even while the disc is rotating. The laser optics 39 for reading from and/or writing to the disc media section 16 are illustratively shown in a depressed track of the tray and are moved across the disc as it is rotated. There are electrical connections from the laser optics 39 through the cable 49 to the electronic components on the circuit board 36 so that information can be recorded on and/or read from the disc media section 16.

The drive shown in FIG. 4 is to be representative of all of the types of drives in which the tray carries the disc drive motor and its spindle and the tray is moved into and out of a housing in which the drive electronic components are located; or in which a tray that extends out of and is retractable back into the housing has an open bottom and the drive motor spindle extends through the disc hole 14 when the tray is retracted back into the housing; or a stationary tray accessible from a slot in the front of the housing through which the disc is loaded into the tray. The drive also applies to stand alone drives and drives found in game consoles. All of these types of drives can have their spindles modified to have their drive spindles and/or hubs modified to have the necessary electrical connections and contacts to work with the flash memory of the disc 20. Also, all of the drives will be backward compatible for use with conventional discs.

In operation of the invention, the disc 20 is loaded into the tray 34 with the contacts 26 to the flash memory 24 of the disc core engaged with the contacts 46 on the drive spindle 42 or on the spindle base 43. There can be indicia on the tray and/or disc to aid in proper alignment and engagement of the disc and spindle contacts 26 and 46. Another manner of obtaining alignment is to place a vertical slot in the drive spindle and a mating tab extending from the disc core 22 into the center hole 14 to fit in the spindle slot. Such a drive would still be backward compatible for conventional discs.

Figure 5A:
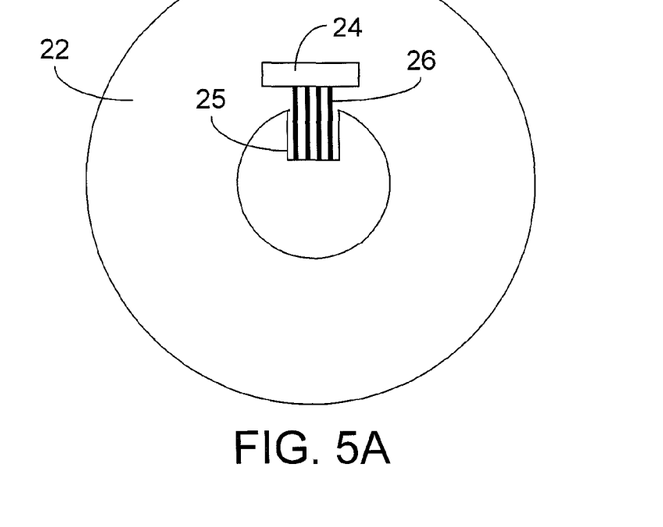
FIG. 5A is a plan view of a disc core having an alignment tab and FIG. 5B is an elevational view of the drive spindle showing another embodiment of an arrangement for making electrical connection between the disc flash memory and external components of the drive.
Figure 5B:
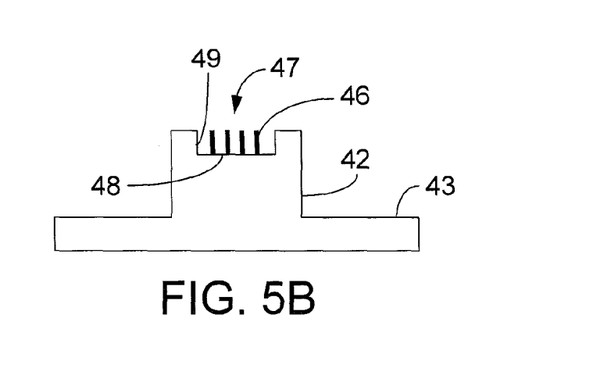

FIG. 5A shows the core 22 with an alignment tab 25 as described above. Here the flash memory 24 is embedded in the core also as described above. The flash memory contacts 26 extend over the edge of the tab wall. In FIG. 5B the spindle 42 of the drive is shown as having a slot 47 having a bottom wall 48 and on whose inner vertical wall 49 are the contacts 46 that are to mate with the disc contacts 26. As an alternative to the mating contact arrangement shown the contacts 26 can be only on the flat lower surface of the core tab 25 and the spindle contacts 46 on the slot bottom wall 48.

Figure 6A:
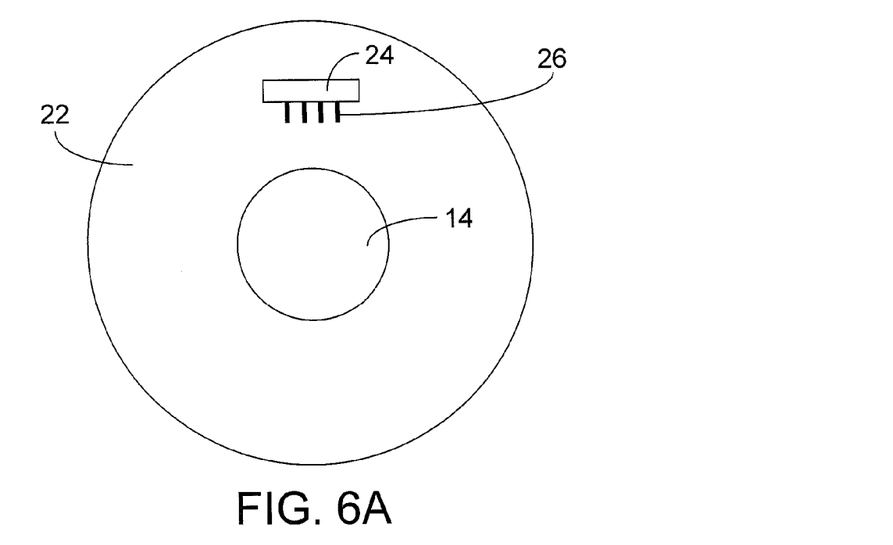
FIG. 6A is a bottom plan view of another type of disc core and FIG. 6B a top view of the spindle hub of the drive showing another embodiment of the connection between the flash memory and the drive.
Figure 6B:
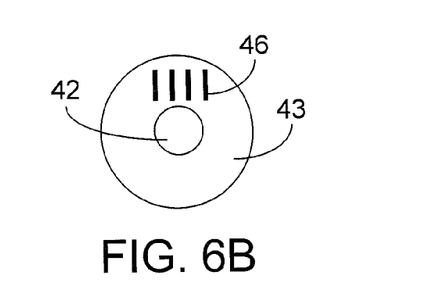
Figure 7:
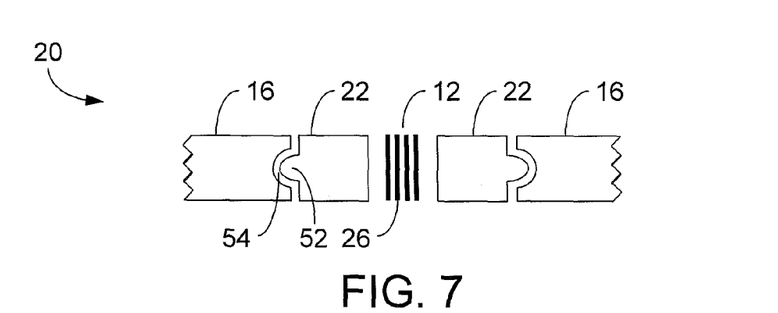
FIG. 7 is fragmentary view in cross section showing a disc in which the core having the flash memory can be removed and replaced.

FIGS. 6A and 6B show another embodiment in which the flash memory contacts 26 are on the lower surface of the core 22 and the mating contacts 46 of the drive are located on the spindle hub 43 flat base. In this embodiment there can be indicia on the disc and/or drive tray 34 to align the contacts 26 and 46 or the tab and slot arrangement of FIGS. 5A and 5B can be used FIG. 7 shows an embodiment of the disc 20 in which the central core 22 is removable. Here, there are one or more mating ribs and grooves 52 and 54 on the outer periphery of the core 22 and the inner periphery of the disc media section 16. This permits the core 22 having the flash memory 24 to be press fit or snapped into the disc media section 16. Therefore, a user of the disc 20 can remove the core 22 and use it with another disc if the disc media section has become damaged. This saves the custom information. Also, a user can carry the removable core from place to place to be inserted as the core for another disc 20. Also, two users might be playing the same game on a competitive basis. Both users can use his custom information merely by inserting his core 22 into the media section of the same game disc. Further, the core alone with its flash memory can be used as the equivalent of a removable storage disc.

All types of conventional data can be recorded onto and read from the media section 16 of the disc 20 and any desired data can be written into and read from the flash memory. In a modification of this the media section 16 can be made read only and the flash memory 24 be read/write. A display of the drive properties would show the disc media section 16 as being full and the flash drive 24 having whatever free memory being available to be written into.

Other uses of the disc 22 would be where the media section 16 has an application program and content is written back to the flash memory for storage in proximity to the application itself. Applications could add additional content to the flash memory portion of the disc at any time to aid in securing the content. Updates can be added to the flash memory so that when an application is installed from the disc media the user doesn't have to immediately download the updates. This is especially useful on a stand-alone system that is not connected to the Internet. A music album can be burned onto the disc as well as contain digital versions on the flash memory. Digital signatures can be stored on the flash memory showing ownership of the music on the disc. Licensing information can be listed in the flash memory and updated when new licenses are acquired. It is seen as particularly advantageous for a gaming environment where users move from one console to another at different times.

While the disc is spinning, data can be read and written to the embedded flash memory via the connectors. To the computer it will appear as an additional removable media drive (F: drive, for example) with an indicator that the drive is embedded into the disc located in DVD Drive E. Over time computers would be enhanced to show the new DVD/Flash drive but current computers could be accommodated. The flash drive generally has the same dimensions and similar weight to the plastic interior of a traditional disc so these discs are entirely compatible with existing drives. The inside rim contains the connectors to communicate with the spindle that holds the disc in place and spins it. Because the connectors are securely fitted to the spindle in the disc drive, the flash drive can be written to while the disc is in use. The flash drive can be popped out of one disc and put inside another disc, making it portable and upgradable.

Specific features of the invention are shown in one or more of the drawings for convenience only, as each feature may be combined with other features in accordance with the invention. Alternative embodiments will be recognized by those skilled in the art and are intended to be included within the scope of the claims. Accordingly, the above description should be construed as illustrating and not limiting the scope of the invention. All such obvious changes and modifications are within the patented scope of the appended claims.

I claim:

1. A method comprising:
   providing a disc having an outer section on which digital data is recorded and an inner core having a central hole and an alignment tab extending into said central hole, said inner core including a flash memory with at least one electrical contact, said at least one electrical contact extending from said flash memory onto a peripheral wall of said inner core forming said central hole;
   engaging said at least one electrical contact of said flash memory with at least one drive electrical contact of a drive spindle of a disc drive, said drive spindle having a vertical slot to accommodate said alignment tab of said inner core; and
   while rotating the disc in the disc drive about the drive spindle extending into said central hole of said inner core, performing one of reading data from or writing data to said flash memory via said at least one drive electrical contact of said drive spindle.

2. The method as claimed in claim 1 wherein said at least one drive electrical contact is accessible from an outer periphery of said drive spindle.

3. The method as claimed in claim 1 wherein said at least one electrical contact is on said alignment tab of said inner core, and wherein said at least one drive electrical contact is in said vertical slot of said drive spindle.

4. The method as claimed in claim 1 further comprising, while rotating the disc, simultaneously reading data optically from the outer section of said disc and reading data electrically from the flash memory.

5. The method as claimed in claim 1, wherein said at least one electrical contact extending from said flash memory onto a peripheral wall of said inner core forming said central hole is a plurality of electrical contacts, and wherein said at least one drive electrical contact of said drive spindle of said disc drive is a plurality of drive electrical contacts.

6. A method comprising:
   providing a disc having an outer section on which digital data is recorded and an inner core having a central hole and an alignment tab extending into said central hole, said inner core including a flash memory with at least one electrical contact, said at least one electrical contact extending from said flash memory;
   engaging said at least one electrical contact of said flash memory with at least one drive electrical contact of a drive spindle base of a drive spindle of a disc drive, said drive spindle having a vertical slot to accommodate said alignment tab of said inner core and said drive spindle base supporting said disc; and
   while rotating the disc in the disc drive about the drive spindle extending into said central hole of said inner core, performing one of reading data from or writing data to said flash memory via said at least one drive electrical contact of said drive spindle base.

7. The method as claimed in claim 6 wherein said at least one electrical contact extending from said flash memory is on said alignment tab of said inner core, and wherein said at least one drive electrical contact of said drive spindle base is in said vertical slot of said drive spindle.

8. The method as claimed in claim 6 further comprising, while rotating the disc, simultaneously reading data optically from the outer section of said disc and reading data electrically from the flash memory.

9. The method as claimed in claim 6, wherein said at least one electrical contact extending from said flash memory is a plurality of electrical contacts, and wherein said at least one drive electrical contact on said drive spindle base of said drive spindle of said disc drive is a plurality of drive electrical contacts.

* * * * *